G. MENGEL.
LENS FOR PLACING BEFORE A PHOTOGRAPHIC OBJECTIVE.
APPLICATION FILED AUG. 4, 1915.
1,169,731.
Patented Jan. 25, 1916.
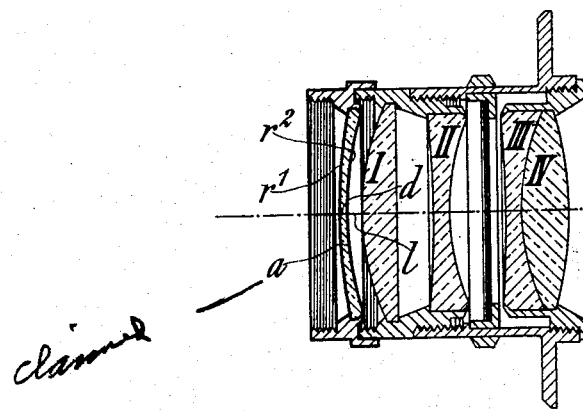
Inventor
Guido Mengel.

UNITED STATES PATENT OFFICE.

GUIDO MENGEL, OF DRESDEN, GERMANY, ASSIGNOR TO THE FIRM OF CARL ZEISS, OF JENA, GERMANY.

LENS FOR PLACING BEFORE A PHOTOGRAPHIC OBJECTIVE.

1,169,731.  Specification of Letters Patent.  Patented Jan. 25, 1916.

Application filed August 4, 1915.  Serial No. 43,679.

*To all whom it may concern:*

Be it known that I, GUIDO MENGEL, a citizen of the German Empire, residing at Dresden, Germany, have invented a new and useful Lens for Placing Before a Photographic Objective, of which the following is a specification.

The invention relates to a simple dispersive lens in the shape of a meniscus, which is intended to be placed in front of a photographic objective with its concave surface turned toward the latter, for the purpose of increasing the focal length of the said objective and thus enlarging the scale of the image formed by the objective.

A serviceable lens of this sort, *i. e.*, a lens, which does not counteract even for slight inclinations the correction of the objective, before which it is placed, more than is permissible, has so far not become known. The reason seems to lie in the fact that, although the need has been recognized and experiments have been made to satisfy it, no way has been found, on which the question to be solved may be systematically worked out.

The present invention rests on the knowledge, that the part to be played by a lens of the kind mentioned with regard to the objective in front of which it is placed is akin to the part to be played by a spectacle-glass with regard to an axially symmetrical, shortsighted eye, which is to be made capable by the spectacle-glass of sharply observing objects, which are at some distance from the eye, even for comparatively strongly inclined directions of vision. As is well known, such a spectacle-glass should as far as possible be formed in such a manner that it forms with the aid of the ray pencils crossing each other in the center of rotation of the eye after passing through the spectacle-glass a virtual image, which is on the one hand free from astigmatism and on the other hand lies on a spherical surface, which has the center of rotation of the eye as its center. The former, more important requirement of anastigmatism is satisfied, as is well known, by a simple spectacle-glass, when too high a power is not necessary, if its median curvature corresponds approximately to the Tscherning curve belonging to the fixed distance between the center of rotation of the eye and the spectacle-glass surface facing it and which gives in general two forms of spectacle-glass, a more strongly curved "Wollaston" form and a less strongly curved "Ostwalt" form. While in general the second requirement is fulfilled neither by the Wollaston nor by the Ostwalt form, as with both the anastigmatic virtual image surface is usually more flatly curved than the sphere contacting with it in the axis of the spectacle-glass and having the center of rotation of the eye as its center, nevertheless both forms fulfil their purpose well, as the accommodating faculty of the eye is capable of adjusting the said difference.

In the case of a lens intended to be placed before a photographic objective the conditions are quite similar. As in the case of a spectacle-glass in the first place the astigmatism of the virtual image must be removed as far as possible for such pencils as cross each other in the entrance pupil of the objective, after passing through the lens, which can be effected in a sufficient manner just as in the case of the spectacle-glass by the amount of the median curvature. The place of the second requirement in the case of the spectacle-glass is taken in this case by the requirement, that the virtual image shall as far as possible lie on a plane perpendicular to the objective axis. While this condition is in general not capable of being fulfilled in the latter case just as in the case of the spectacle-glass, yet in the case of both lens-forms of the Tscherning curve the approximately equally strong curvature of the virtual image surface proves to be still passable for practical purposes. Contrary to the case of the spectacle-glass, however, a new requirement is added, in the case of the lens under discussion, as the photographic objective used with it usually works with a much larger diaphragm than that assumed in the case of the eye as lying, corresponding to the size of the pupil, in the center of rotation of the eye. Hence it is necessary to see that the ray pencils used are not only free from astigmatism, but also have as small spherical aberrations as possible. This requirement eliminates the more strongly curved Wollaston form as a lens to be placed before an objective, while it can be fulfilled for many cases as far as the Ostwalt form is concerned. For other cases the above mentioned requirement leads to the aforesaid lens being still less curved than is demanded by the Ostwalt branch of the Tscherning curve, in order to strike a mean between the endeavor to obtain freedom from spherical aberrations and the endeavor to obtain freedom from astigmatism.

When using glasses having a not unusual power it follows on the basis of the aforesaid requirements, that with a lens of moderate thickness the radius of curvature of its concave surface should be made at least one and a half times as great and at most four and a half times as great as the distance of the said surface from the entrance pupil of the objective to which it belongs.

Attention was called to the relation between a lens adapted to be placed before a photographic objective and a spectacle-glass by Hanse Dese as far back as in the March number of the 1914 issue of the journal *Photographische Korrespondenz*. The lens there dealt with is, however, without refraction in its axis and is purposely so formed, that, while being as far as possible free from astigmatism, it produces spherical aberrations. That a lens adapted to be placed before a photographic objective can be so formed as to be free to about the same extent from astigmatism and spherical aberrations and to act dispersively at the same time, so that it may be suitable as a lens of the kind mentioned for the present case, was not there recognized.

The drawing shows as a constructional example of the invention a lens $a$ in connection with an unsymmetrical objective composed of four members I, II, III and IV, the entrance pupil of which, taking the focal length of the objective as equal to 100, has a distance equal to 14 from the front surface of the same. The lens $a$ can be placed in a simple manner by means of its mount on the front of the objective. Below the dimensions and distances of two lenses suitable to be placed before the objective and having different focal lengths are given, in both cases the same kind of glass having a refractive index $nD=1.52$ for the line D of the solar spectrum being used. The focal length of the objective is increased by the lens being fitted in front of it from the value 100 in the first example to 137 and in the second example to 165.

| | Example 1. | Example 2. |
|---|---|---|
| Radius of the convex surface | $r^1=50.7$ | 55.5 |
| Radius of the concave surface | $r^2=39.1$ | 37.4 |
| Thickness of the lens | $d=0.75$ | 0.6 |
| Distance of the concave surface from the front surface of the objective | $l=1.35$ | 1.35 |

I claim:

Meniscus shaped, simple, dispersive lens for placing before a photographic objective and intended to face, when in use, the said objective with its concave surface, the radius of curvature of the said concave surface being at least one and a half times and at most four and a half times as great as the distance of the said surface, when the lens is in use, from the entrance pupil of the objective, in front of which it is placed.

GUIDO MENGEL.

Witnesses:
 MARTA PICHEL,
 CLARE SIMON.